(12) United States Patent
Yalamanchi et al.

(10) Patent No.: US 9,355,419 B2
(45) Date of Patent: *May 31, 2016

(54) METADATA MAP REPOSITORY

(71) Applicant: Amazon Technologies, Inc., Seattle, WA (US)

(72) Inventors: Aravind Yalamanchi, Lynnwood, WA (US); Yu Pan, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,792

(22) Filed: Feb. 18, 2015

(65) Prior Publication Data

US 2015/0161693 A1 Jun. 11, 2015

Related U.S. Application Data

(63) Continuation of application No. 13/366,862, filed on Feb. 6, 2012, now Pat. No. 8,990,213.

(51) Int. Cl.
*G06F 17/30* (2006.01)
*G06Q 30/06* (2012.01)
*G06F 12/06* (2006.01)

(52) U.S. Cl.
CPC ........ *G06Q 30/0601* (2013.01); *G06F 12/0646* (2013.01)

(58) Field of Classification Search
CPC ................. G06Q 30/0601; G06F 12/0646
See application file for complete search history.

(56) References Cited

U.S. PATENT DOCUMENTS

| 7,996,862 B2* | 8/2011 | Babu | G06Q 30/02 |
| | | | 725/14 |
| 2002/0055932 A1* | 5/2002 | Wheeler | G06F 17/30557 |
| 2008/0133381 A1* | 6/2008 | O'Brien | G06Q 10/087 |
| | | | 705/26.81 |
| 2008/0189240 A1* | 8/2008 | Mullins | G06F 17/30557 |
| 2010/0299128 A1* | 11/2010 | Aiber | G06Q 10/10 |
| | | | 703/21 |

* cited by examiner

*Primary Examiner* — Apu Mofiz
*Assistant Examiner* — Jared Bibbee
(74) *Attorney, Agent, or Firm* — Thomas Horstemeyer, LLP

(57) ABSTRACT

Disclosed are various embodiments for a catalog mapping tool application. The application is executable in at least one computing device and comprises logic that identifies a system catalog of an item and a user catalog of the item. The system catalog may include a system acceptable format for a value of an attribute associated with the item, and the user catalog may include a user defined format for the value of the attribute associated with the item. The application further comprises logic that receives a selection of one of a plurality of recommended metadata maps for translation from a client device associated with the seller. In addition, the application comprises logic that facilitates translating the user catalog to the system catalog based at least in part on the one of the plurality of recommended metadata maps.

20 Claims, 6 Drawing Sheets

| Product Title | Screen size | Depth | Price |
|---|---|---|---|
| Plasma 2000 TV | 43 Inch | 4 | 645.95 |
| LCD BrightScreen TV | 50 Inch | 6 | 779.99 |
| Cinerama ATA Television | 46 Inch | 5 | 549.99 |

FIG. 2A

| Product Title | Dimensions | Price |
|---|---|---|
| Plasma 2000 TV | 43, 4 | $645.95 USD |
| LCD BrightScreen TV | 50, 6 | $779.99 USD |
| Cinerama ATA Television | 46, 5 | $549.99 USD |

FIG. 2B

Upload your mapping

Enter name of your mapping ⟋ 412

Enter description of your mapping ⟋ 415

Select Industry ▼ — 418
- Computers
- Televisions
- ⋮
- Other

Select standard or format ▼ — 421
- OnlineSeller
- zBay
- ⋮
- Other

Define Rule — 422

Submit and Share — 423

METADATA MAP REPOSITORY

CROSS REFERENCE TO RELATED APPLICATIONS

This application is a continuation of, and claims priority to, co-pending U.S. patent application entitled "METADATA MAP REPOSITORY," filed on Feb. 6, 2012 and assigned application Ser. No. 13/366,862, which is incorporated herein by reference in its entirety.

BACKGROUND

The electronic marketplace facilitates transactions between a multitude of e-commerce sellers and customers. An electronic commerce system offers services to sellers for assisting sellers in the operation of their respective businesses. An electronic commerce system can maintain a catalog of items for each seller who is employing the services of the electronic commerce system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2A is a drawing of one example of data stored in association with a user catalog in the networked environment of FIG. 1 according to various embodiments of the present disclosure.

FIG. 2B is a drawing of one example of data stored in association with a system catalog in the networked environment of FIG. 1 according to various embodiments of the present disclosure.

FIGS. 3-4 are drawings of examples of user interfaces rendered by a client in the networked environment of FIG. 1 according to various embodiments of the present disclosure.

DETAILED DESCRIPTION

The present disclosure introduces a metadata map repository for assisting a variety of individual e-commerce sellers in building a catalog of items. Sellers may employ the services of an electronic commerce system or any other system platform to sell items to customers over an electronic marketplace. The electronic commerce system allows buyers to view items that are sold by a multitude of sellers. These items are maintained as a catalog of items managed by the electronic commerce system. However, the electronic commerce system may be configured to recognize only a system catalog format. Thus, sellers who developed their own native catalogs may encounter difficulties where their native catalogs are not properly recognized by the electronic commerce system. That is to say, sellers may already maintain a catalog of items that they wish to migrate to the electronic commerce platform operated by the electronic commerce system.

Various embodiments of the present disclosure discuss a metadata map repository for facilitating the translation of native catalogs created by sellers into system catalogs recognized by an electronic commerce system. Specifically, a catalog mapping tool allows sellers to upload a native user catalog. A seller may choose a recommended metadata map to map at least a portion of the native user catalog into a system catalog. This allows sellers to efficiently create system catalogs based on the user catalog without extensive manual input. In the following discussion, a general description of the system and its components is provided, followed by a discussion of the operation of the same.

Figure 1:
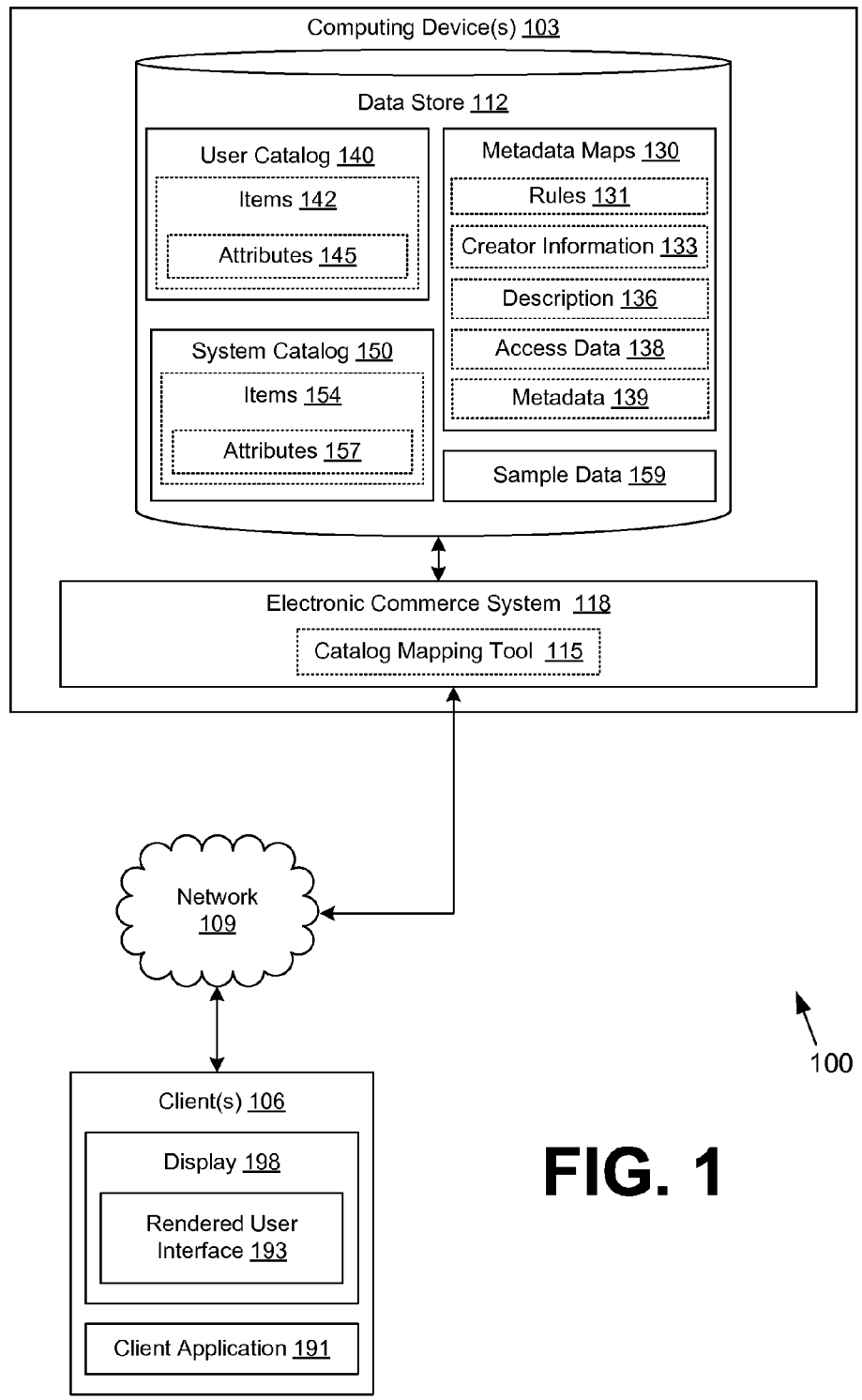
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. The components executed on the computing device 103, for example, include an electronic commerce system 118 and other applications, services, processes, systems, engines, or functionality not discussed in detail herein.

The electronic commerce system 118 is executed in order to facilitate the online purchase of items over the network 109. The electronic commerce system 118 also performs various backend functions associated with the online presence of a merchant in order to facilitate the online purchase of items. For example, the electronic commerce system 118 generates network pages such as web pages or other types of network content that are provided to clients 106 for the purposes of selecting items for purchase, rental, download, lease, or other form of consumption as will be described. The electronic commerce system 118 may employ the functionality of an inventory management system for allowing sellers to manage and track their inventory. The Electronic commerce system 118 includes a catalog mapping tool 115 and/or any other modules or components.

The catalog mapping tool 115 allows sellers to create, modify, edit, maintain, and/or manage one or more catalogs of items. Sellers maintain a catalog of items when employing the services of the electronic commerce system 118 or any other system platform. The catalog of items assists a seller in making transactions for the purchase of items over the electronic market place. The catalog mapping tool 115 is configured to generate a system catalog based on an inputted user catalog.

The data stored in the data store 112 includes, for example, user catalogs 140, system catalogs 150, metadata maps 130, sample data 159, and potentially other data. The user catalogs 140 may be native catalogs uploaded by sellers. Sellers may store one or more user catalogs 140 in the data store 112. A user catalog 140 includes one or more items 142 and each item 142 may be associated with one or more attributes 145. Similarly, the data store 112 includes system catalogs 150. System catalogs 150 are encoded in a format that is recognized by the electronic commerce system 118 or any other system platform. One or more system catalogs 150 are maintained for each seller. A system catalog includes one or more items 154 and each item 154 may be associated with one or more attributes 157.

The data stored in the data store 112 also includes metadata maps 130. A metadata map 130 is used to describe how to translate one format to another format. Each metadata map 130 can include rules 131, creator information 133, a description 136, access data 138, and any other data relating to the metadata map 130. Rules 131 comprise prequalification information that indicates formats applicable to a particular metadata map 130. To this end, rules 131 express data patterns that a particular metadata map 130 is configured to translate. Creator information 133 is used to track who created a particular metadata map 130. The metadata map description 136 explains various aspects and applications for a particular metadata map 130. Access data 138 may also be associated with a particular metadata map 130 for tracking the frequency or rate a particular metadata map 130 is accessed. Metadata 139 related to a particular metadata map 130 may also be stored in the data store 112. Metadata 139 for a metadata map may indicate a category or a class of a particular metadata map 139. Additionally, in the data store 112, sample data 159 is stored. Sample data 159 includes data relating to potential values for attributes based on systematic use of the catalog mapping tool 115. In various embodiments, each metadata map 130 may have corresponding sample data 159 relating to the items or attributes of a particular metadata map 130.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 198. The display 198 may comprise, for example, one or more devices such as cathode ray tubes (CRTs), liquid crystal display (LCD) screens, gas plasma-based flat panel displays, LCD projectors, or other types of display devices, etc. A rendered user interface 193 may be presented in the display 198.

The client 106 may be configured to execute various applications such as a client application 191 and/or other applications. The client application 191 may be executed in a client 106 for example, to access and render network pages, such as web pages, or other network content served up by the computing device 103 and/or other servers. The client application 191, for example, may be email applications, instant message applications, browser applications, and/or other applications.

Next, a general description of the operation of the various components of the networked environment 100 is provided. To begin, a seller wishing to employ the services of an electronic commerce system may have created a user catalog of items. Moreover, the electronic commerce system might not be configured to recognize the formatting of the user created catalog. For example, the user catalog may include abbreviations or structure not recognized by the electronic commerce system. Thus, a seller may wish to map the user catalog into a system catalog.

Specifically, a seller or any other user may send a user catalog 140 to be stored in a data store 112. The seller may use one or more clients 106 to send data comprising a user catalog 140 to be stored in a respective user account for the seller. The user catalog 140 can be a native catalog defined in terms and formats specified by the seller. For example, a seller may use a format that is based upon a standardized way of describing the items 142 sold by the seller. In one example, a seller uploads a user catalog 140 by way of a network 109. The user catalog 140 includes a multitude of items 142 and each item 142 is defined by one or more attributes 145. For example, the attributes 145 are associated with values that are encoded in a format that complies with a predefined standard, such as an industry standard, for describing nutritional facts, product dimensions, product size, or any other standardized way of describing items 142. In this case, the seller may be accustomed to reading, writing, viewing, and manipulating the values of the attributes 145 in the manner described by the particular industry standard. Thus, the user catalog 140 is a native catalog that may be very familiar to the user.

A catalog mapping tool 115 is configured to provide an interface for allowing sellers to upload, edit, and maintain their user catalogs 140. For example, the catalog mapping tool 115 encodes a user interface and transmits the encoded user interface for display at one or more clients 106. Specifically, a seller may view the rendered user interface 193 in a display 198 of the client 106. The catalog mapping tool 115 facilitates receiving one or more user catalogs 140 from a variety of sellers and storing the user catalogs 140 in a data store 112.

The electronic commerce system 118 provides various services to assist a seller in operating his or her e-commerce business. The electronic commerce system 118 uses system catalogs 150 in providing services for sellers. Accordingly, system catalogs 150 are stored in a format that is accepted by the platform of the electronic commerce system 118 or any other system platform. It may be the case that the user catalog is not encoded in a format that is acceptable to the electronic commerce system 118. The catalog mapping tool 115 is configured to convert user catalogs 140 into system catalogs 150. As a result, the catalog mapping tool 115 is responsible for receiving user catalogs 140 that are defined by a seller and converting the user catalog 140 into a corresponding system catalog 150 that is accepted by the electronic commerce system 118.

The catalog mapping tool 115 employs various algorithms for translating a value encoded in a first format into a value encoded in a second format. For example, the algorithms comprise one or more rules for instructing the translation from a first format into the second format. For every format to format translation, a metadata map 130 may exist. Accordingly, the catalog mapping tool 115 stores various metadata maps 130 for decoding a value in a first format and encoding the value in a second format. Additionally, the catalog mapping tool 115 implements the metadata mapping. That is it say, the catalog mapping tool 115 performs the conversions for encoding values into a second format.

A user catalog 140 may be a user catalog of items such that the user catalog includes multiple items. Depending on the item 142, one or more attributes 145 may be associated with the item 142 for describing the item 142 for identification and manipulation. For each attribute 145, there exists a corresponding value making an attribute-value pair. For example, an attribute 145 for an item 142 may be "size" and the value of that attribute 145 may be "9." The value may be encoded in in various formats such as "9," "nine", "size 9", etc. Thus, while each value is equivalent in this example, the format in which the value is encoded may vary. A metadata map 130 can indicate, to the catalog mapping tool 115, how to translate a value of one format to another.

In one embodiment, the metadata map 130 is configured to address only one particular format of a value or attribute-value pair. In this case, a metadata map 130 is dedicated to encoding values of a particular attribute in a particular format. Expanding on the example above where an attribute for an item is "size," the metadata map 130 associated with this attribute may be applied to all items in a user catalog 140 with an attribute of "size." Thus, once an appropriate metadata map 130 is selected, the catalog mapping tool 115 can apply the metadata map 130 throughout a particular user catalog 140.

In another embodiment, a metadata map 130 is configured to map a plurality of formats into a corresponding plurality of formats. Hence, one metadata map 130 may address both "size" and "weight" attributes. Even further, if a particular user catalog 140 has a set of known formats for encoding attribute values, a metadata map 130 may exist that completely describes how to translate all values and encode them in appropriate formats acceptable by the system platform. This is the case where a particular user catalog 140 conforms to a known standard. A predefined standard, for example, may be a standard mandated by a third party seller, an industry, an authoritative organization, or any entity responsible for standardizing data structure formats.

A plurality of metadata maps 130 may be stored in a repository that is accessible to the catalog mapping tool 115. Metadata maps 130 may be created by other sellers, users, manufacturers, or any other entity. Additionally, metadata maps 130 may be created by product developers who developed portions of the catalog mapping tool 115 and/or the electronic commerce system 118. Thus, over time, the repository of metadata maps 130 may grow as users continue contributing to the number of available metadata maps 130.

The catalog mapping tool 115 is configured to assist a seller in creating a system catalog 150 recognized by a system platform such as the platform upon which the electronic commerce system 118 is executed. The system catalog 150 is generated based on an uploaded user catalog 140. The catalog mapping tool 115 provides a seller one or more recommendations for a metadata map 130 that can assist the seller in converting a user catalog 140 into a system catalog 150.

Each metadata map 130 may include creator information 133. In one example, the creator information 133 comprises a creator name for identifying the creator, the industry of the creator, the number of metadata maps 130 a particular creator has created, or any other information relating to the creation of the metadata map 130. In one embodiment, the catalog mapping tool 115 uses the creator information 133 for generating the recommended metadata maps 130 for subsequent users. For example, if a particular seller is searching for a metadata map 130 to map his or her user catalog 140 to a system catalog 150, the catalog mapping tool 115 may recommend a particular metadata map 130 based on a match between the profile of the seller and the creator information 133 of the particular metadata map 130. Thus, two sellers in the same industry are likely to require the same type of metadata map 130.

Additionally, each metadata map 130 may include a description 136 of the metadata map 130 for classifying the metadata map 130 for identification. The catalog mapping tool 115 may determine the mapping needs of a seller based on a profile of the seller or the contents of the user catalog 140 and then match it to a description 136 of a metadata map 130. Furthermore, the catalog mapping tool 115 can store the number of times a particular map is used by a seller as access data 138. In one embodiment, the access data 138 reflects the popularity of a metadata map 130. The catalog mapping tool 115 uses this access data 138 to generate recommendations for a seller. Furthermore, in recommending metadata maps 130, the catalog mapping tool 115 may use metadata 139 relating to a particular metadata map 130 to identify a relevant category or class of metadata maps 130 for a seller. For example, if a seller sells items relating to "nutrition," the catalog mapping tool 115 can identify metadata maps 130 from a global repository that are directed towards data formats relating to "nutrition" items and/or attributes.

Thus, through the use of recommended metadata maps 130, a user can generate a system catalog of items without extensive manual input.

Referring next to FIG. 2A, shown is one example of data stored in association with a user catalog 140 in the networked environment of FIG. 1 according to various embodiments of the present disclosure. FIG. 2A depicts a representation of the organization of a user catalog 140. The user catalog 140 includes a plurality of items 142, such as, for example, three different television items 142. Each item 142, for example, has various attributes 145 such a product title, screen size, depth, and price. These attributes 145 are defined by the seller when the seller created the user catalog 140 of FIG. 2A.

Furthermore, each attribute 145 for each item 142 has a corresponding value. One way of describing the user catalog 140 is through a plurality of attribute-value pairs. Each attribute-value pair is encoded in a format defined by the seller who created the user catalog 140. In the example of FIG. 2A, the "screen size" attribute 145 for the "plasma 2000 TV" item 142 indicates data that the screen size of the "plasma 2000 TV" item 142 has a screen size of 43 inches. This data is encoded as a value with a particular format. The format for all values for a given attribute 145 may all be the same, as seen in FIG. 2A. Here, all "screen size" attribute values conform to the same format or representation of the value. However, a seller may choose, whether intentional or not, different formats for different values for the same attribute 145. In this case, it will be more difficult for the seller to generate a system catalog 150 (FIG. 1) as more metadata maps 130 (FIG. 1) are needed.

Turning now to FIG. 2B, shown is one example of data stored in association with a system catalog 150 in the networked environment of FIG. 1 according to various embodiments of the present disclosure. The system catalog 150 depicted in FIG. 2B represents a system catalog 150 that corresponds to the user catalog 140 of FIG. 2A. In this example, the system catalog 150 includes the same three television items 154 of the corresponding user catalog 140 of FIG. 2A. Furthermore, each item 154 of the system catalog has one or more attributes 157 such as "product title", "dimensions", and "price."

In this case, a seller has uploaded a user catalog 140 to be stored in a data store 112 (FIG. 1). The seller has defined a particular format and style in describing the user catalog 140. Various applications, such as an electronic commerce system 118 (FIG. 1) running on a system platform, may not recognize the user catalog 140. One reason for this is the seller who uploaded the user catalog 140 did not conform to particular formats and standards required by the system platform. Ultimately, the user may want to take the data of the user catalog 140 and convert it into a format recognized by the system platform for employing the services of a platform application, such as the electronic commerce system 118.

As seen in the example of FIG. 2B, the format of the system catalog 150 has both similarities and differences to that of the format of the corresponding user catalog 140 of FIG. 2A. To begin, both catalogs generally have equivalent content. For example, the user catalog 140 of FIG. 2A and the system catalog 150 are both catalogs of the same items; three televisions. Both catalogs are described by similar attributes.

For example, both the user catalog 140 and the system catalog 150 have a "product title" attribute for each of the television items. The values associated with this "product title" attribute are both represented in the same format. Thus, in this case, a seller who wishes to convert the "product title" aspect of his or her user catalog 140 is not required to do any additional work in regard to creating a corresponding system catalog 150. To this end, a metadata map 130 (FIG. 1) is not required to generate formatted values for the product title column of the system catalog 150.

However, there are differences between the two catalogs. These differences may necessitate the use of a metadata map 130 for creating the system catalog 150. For example, while the user catalog 140 has a "screen" attribute 145 and a "depth" attribute 145 for defining the television items 142, the system catalog 150 has a "dimension" attribute 157. In this example, the dimension attribute 157 comprises a screen size and a depth. Thus, in this example, the combination of the "screen" attribute 145 and a "depth" attribute 145 of the user catalog 140 is equivalent to the "dimension" attribute 157 of the system catalog 150. Accordingly, for a particular item, the values of the "screen" attribute 145 and a "depth" attribute 145 are equivalent to the value of a corresponding "dimension" attribute 157. That is to say, the same data is represented, but the data is encoded in different formats.

To create the system catalog 150 from the user catalog 140, a metadata map 130 would need to first decode the value of a "screen" attribute 145 and a "depth" attribute 145 and then combine both values and generate a value for the dimension attribute 157 encoded in the format depicted in FIG. 2B. A metadata map 130 can be applied to the "screen" attribute 145 and the "depth" attribute 145 of all television items 142 (FIG. 2A) to generate a portion of a corresponding system catalog 150

Similarly, in this example, both the user catalog 140 and the system catalog 150 include a "price" attribute. The "price" attribute 145 of the user catalog 140 maps one-to-one to the "price" attribute 157 of the system catalog 150. However, in this case, the values of the attribute-value pair for the "price" attribute are the same; the values are encoded in different formats when moving from the user catalog 140 to the system catalog 150. The seller may apply an appropriate metadata map 130 to encode the price values in the format seen in the exemplary system catalog 150.

To summarize, a seller may need to create a catalog of items recognized by the system platform. To convert the user catalog 140 of the seller into a recognizable system catalog 150, the seller can use one or more metadata maps 130 to map the one or more attribute-value pairs into the appropriate system format.

Figure 3:
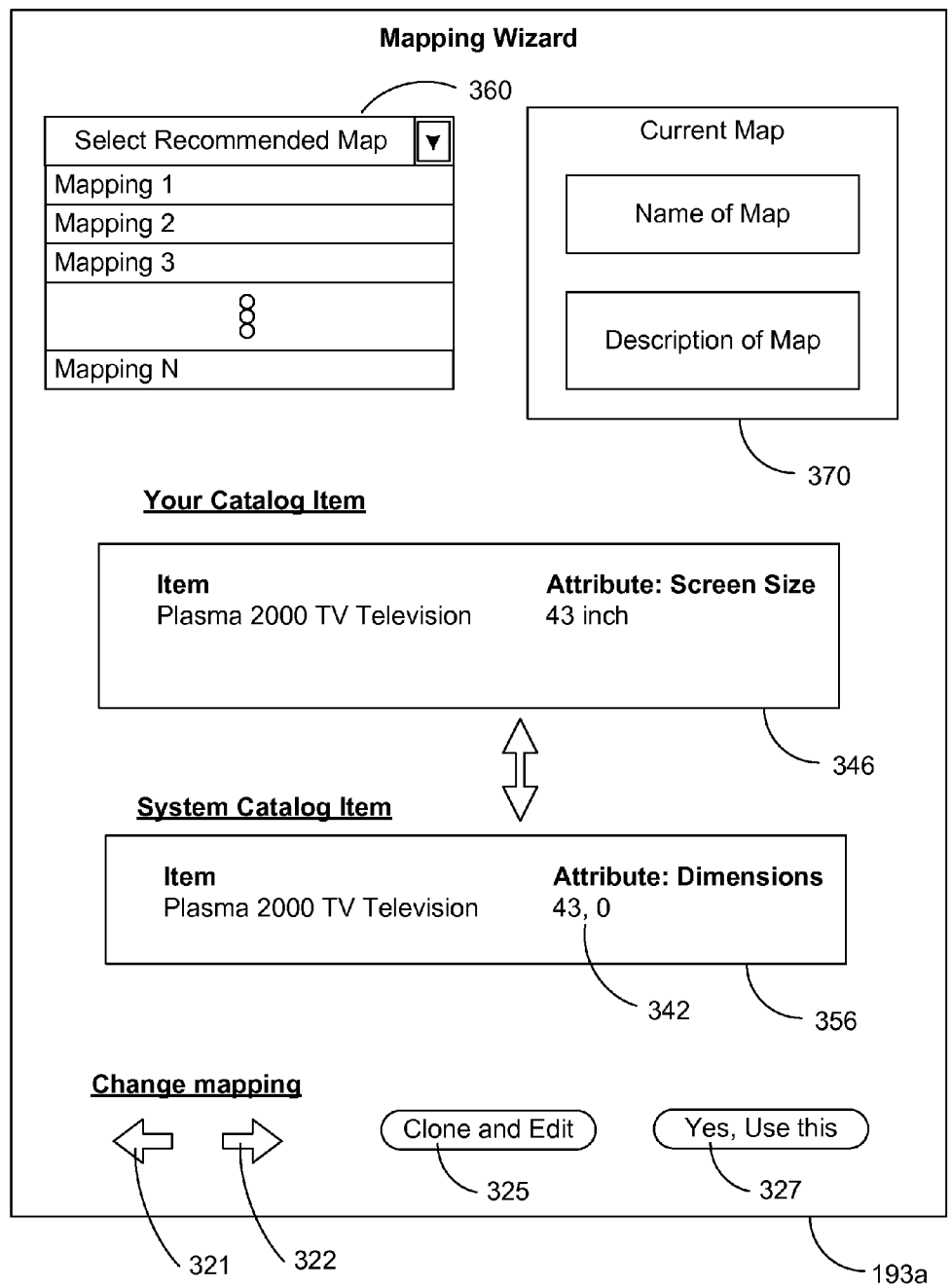

Moving on to FIG. 3, shown is a drawing of an example of a user interface rendered by a client in the networked environment of FIG. 1 according to various embodiments of the present disclosure. In this example, a mapping wizard is presented to a seller to assist the seller in identifying, creating, and applying one or more metadata maps 130 (FIG. 1) in order to generate a system catalog 150 (FIG. 1).

A catalog mapping tool 115 (FIG. 1) is configured to generate network pages and transmit the network pages to a client 106 (FIG. 1) over a network 109 (FIG. 1). The catalog mapping tool 115 encodes a user interface for display in the client 106. FIG. 3 depicts an example of a rendered user interface 193*a* as seen by a seller using the client 106. After a seller uploads a user catalog 140 (FIG. 1), the seller may interact with the rendered user interface 193*a* for the purpose of creating a system catalog 150 based on the uploaded user catalog 140.

The rendered user interface 193*a* is a mapping wizard or any other interface that allows a user to select or implement one or more metadata maps 130. The rendered user interface 193*a* includes a map list interface 360. The map list interface 360, for example, presents one or more metadata maps 130 for the seller to select. In one embodiment, these metadata maps 130 are recommended ones that the catalog mapping tool 115 determines as recommended maps. Recommended maps are determined based on various inputs such as the profile of the seller, the data representing in an uploaded user catalog 140, or any other data that allows the catalog mapping tool 115 to recommend a relevant metadata map 130. In one embodiment, the map list interface 360 is a drop down menu for facilitating a recommended map selection.

The rendered user interface 193*a* includes a map information interface 370. The map information interface 370 displays information to the seller regarding a selected map. Additionally, the rendered user interface 193*a* includes a user catalog preview 346 and a system catalog preview 356. In one embodiment, the system catalog preview 356 presents a preview of how a selected map would be implemented if applied to a portion of the user catalog 140. Additionally, a back button 321 and a next button 322 are included in the rendered user interface 193*a* to allow a seller to cycle through a plurality of metadata maps 130.

Furthermore, the rendered user interface 193*a* includes an accept button 327 to initiate the application of a selected metadata map. Also, a clone and edit button 325 is presented to the seller for allowing the seller to make modifications to a pre-existing selected metadata map.

The mapping wizard depicted in the rendered user interface 193*a* is an interactive interface that allows a seller to quickly build system catalogs 150 from uploaded user catalogs 140. To begin, the map list interface 360 presents one or more metadata maps 130 to a seller. In one embodiment, the catalog mapping tool 115 identifies a set of metadata maps 130 among a repository of metadata maps 130 to recommend to the seller. The catalog mapping tool 115 employs various methods to generate a recommended set of metadata maps 130 and then present the set of recommended maps to the seller in the map list interface 360.

For example, each metadata map 130 includes corresponding creator information 133 (FIG. 1), description 136 (FIG. 1), and access data 138 (FIG. 1). Based on the content of the user catalog 140, the catalog mapping tool 115 may search the metadata map repository to identify similar matching maps based on key words in the creator information 133 or description 136. For example the catalog mapping tool 115 determines that an uploaded user catalog 140 includes many items with attributes 145 (FIG. 1) relating to nutritional facts. The catalog mapping tool 115 can search throughout the descriptions 136 of metadata maps 130 to identify a set of relevant metadata maps 130 relating to catalogs in the food industry. Furthermore, the catalog mapping tool 115 can search various creator information 133 to identify whether a particular creator of a metadata map 130 has developed system catalogs 150 relating to items in the food industry.

Additionally, the catalog mapping tool 115 can use access data 138 associated with each metadata map 130 to determine which maps are popular. Metadata maps 130 that have been used frequently may be more likely to be relevant to the seller.

In one embodiment, the catalog mapping tool 115 uses sample data 159 (FIG. 1) to recommend metadata maps 130 for a seller. Sample data 159 is a continuously updated data set of commonly observed attribute-value pairs. For example, sample data 159 can indicate that a particular manufacturer typically includes certain attributes in defining an item. Furthermore, the particular manufacturer may encode attribute-value pairs in a standardized format. Accordingly, the catalog mapping tool 115 can identify that an uploaded user catalog 140 includes references to this manufacturer. Thus, the catalog mapping tool 115 can generate expected attributes and attribute-value pairs based on consulting the sample data 159. Specifically, the sample data 159 may provide a heuristic approach for allowing a catalog mapping tool 115 to determine appropriate recommended metadata maps 130 for a seller. Information stored as sample data 159 is continuously being updated as new standards and new attributes are introduced to the catalog mapping tool 115. For example, as new brands, products, or product features enter the market place, the sample data 159 may reflect new standards and attributes.

In various embodiments, the catalog mapping tool 115 may apply one or more rules 131 or prerequisites for identifying recommended metadata maps 130. Rules 131 may reflect the minimum conditions required before a catalog mapping tool 115 considers recommending a particular metadata map 130. For one example of a rule, the user catalog 140 must have values encoded in a particular format before a particular metadata map 130 is considered for recommendation to a seller. Otherwise the particular metadata map 130 is not considered by the catalog mapping tool 115. The particular format, for example, may be an order of digits and/or characters in expressing the value of an attribute. Thus, in various embodiments, the catalog mapping tool 115 may apply one or more rules 131 or prerequisites to the user catalog 140 to assist the catalog mapping tool 115 in determining relevant metadata maps 130. To this end, rules 131, as applied to a particular user catalog 140, are used to filter out irrelevant metadata maps 130 with respect to the user catalog 140. The catalog mapping tool 115 may then determine which metadata maps 130 to recommend among a set of relevant metadata maps 130. As seen above, the catalog mapping tool 115 can recommend a metadata map 130 based on a variety of criteria such as creator information 133, description 136, access data 138, sample data 159, and/or any other data relating to the metadata map 130.

Once the mapping wizard of the rendered user interface 193a presents a set of recommended metadata maps 130 to a seller in the map list interface 360, the seller may select one of the presented recommended maps. Upon selection, the map information interface 370 presents information regarding the selected metadata map 130. For example, the map information interface 370 may present the name of the map, the description of the map, the creator of the map, the popularity of the map, or any other information. This information allows the seller to verify the selected map.

Additionally, the mapping wizard may present a user catalog preview 342. This user catalog preview 342 displays at least a portion of the user catalog 140 that the seller wishes to convert. In one embodiment, the user catalog preview 342 displays a line item of the user catalog 140 that is subject to conversion. This interface informs the seller as to which attribute-value pair is currently being addressed by the catalog mapping tool 115.

The mapping wizard also presents a system catalog preview 354 that presents a portion of a system catalog 150 that corresponds to the portion depicted in the user catalog preview 342. Moreover, the system catalog preview 356 visually demonstrates how a selected mapping would be applied to the portion of the user catalog 140 depicted in the user catalog preview 342. That is to say, the catalog mapping tool 115 extracts a value of an attribute represented in the user catalog preview 342 and encodes it in a format defined by the selected metadata map 130 for display to the seller. This allows the seller to check the accuracy of the selected metadata map 130 before accepting it.

If the seller accepts the selected metadata map 130, then the seller can click the accept button 327 and move on. In one embodiment, after the accept button 327 is checked, the catalog mapping tool 115 determines a subsequent attribute-value pair that requires mapping and then presents it to the user. In another embodiment, the catalog mapping tool 115 determines that all mapping is complete and then generates a system catalog 150 based on the one or more selected maps.

Alternatively, the seller may choose to not click the accept button 327. Rather, the seller may cycle through recommended metadata maps 130 using the back and next buttons 321 and 322. In one embodiment, as the user cycles through the presented recommended metadata maps 130, the system catalog preview 354 is dynamically updated to visually represent how a selected metadata map 130 would appear if it were implemented.

Moreover, if none of the recommended metadata maps 130 seem applicable, then the seller may select the clone and edit button 325. In one embodiment, clicking this button generates a new user interface for allowing the seller to modify the selected metadata map and edit it. In this example, the seller can leverage the work done, thus far, in creating a metadata map 130. To this end, the seller does not need to start from the beginning of the metadata map creation process.

FIG. 3 additionally provides an example of the metadata map 130 selection process. Using the exampled discussed above with respect to FIGS. 2A and 2B, the user catalog preview 346 depicts a portion of the user catalog 140 of FIG. 2A. Specifically, the user catalog preview 346 presents the first television item and includes the "screen size" attribute along with the corresponding value of "43 inch" encoded in a format specified by the seller.

Furthermore, in this example, the seller has selected a recommended metadata map 130 and accordingly, the rendered user interface 193 has presented a system catalog preview 354 in response to the selection. The applied recommended metadata map 130 results in a corresponding attribute-value pair. The corresponding attribute-value pair is encoded in a format that is associated with the selected metadata map 130. This is displayed to the seller as attribute-value of "43, 0" for the dimensions attribute.

The seller may believe that the selected map is incorrect. The seller wants the resulting attribute-value pair to be formatted as "43, 3" as seen in the exemplary system catalog 150 of FIG. 2B. In this case, the seller can cycle to a new mapping until he or she is satisfied. Alternatively, the seller can click the clone and edit button 325 to modify the selected metadata map 130.

Moving on to FIG. 4, shown is a drawing of an example of a user interface 193b rendered by a client in the networked environment of FIG. 1 according to various embodiments of the present disclosure. Specifically, this user interface 193b provides an example of a user interface that a seller would interact with after creating a metadata map 130 (FIG. 1).

Sellers, users, or any other individual may create metadata maps 130 that are reusable. That is to say, other individuals may leverage the efforts of the creator of a metadata map 130. In one embodiment, creators are compensated or otherwise incentivized to create metadata maps 130. After a creator creates a metadata map 130, whether from scratch or from cloning a previously existing map, the catalog mapping tool 115 (FIG. 1) may encode a map-upload interface for display to a seller. Thus the seller can interact with the map-upload interface as a rendered network page 193b.

The map-upload interface within the rendered network page 193b includes a name form 412, a description form 415, an industry selector 418, a standard selector 421, and a rule definition interface 422. Additionally the rendered user interface 193b may include a submit and share button 423.

After a creator creates a metadata map 130, the creator can use a combination of free text boxes or structured form objects to describe and characterize the created metadata map 130. This facilitates subsequent identification of the created map. In one embodiment, information collected through the use of the name form 412, description form 415, industry selector 418, and standard selector 421 is used to generate the creator information 133 (FIG. 1), description 136 (FIG. 1), and metadata 139 (FIG. 1) associated with each metadata map 130.

Additionally, a creator can use the rule definition interface 422 to define rules 131 (FIG. 1) that are applicable to the metadata map. Rules 131 may comprise information that characterizes acceptable input data formats. Data formats that fall outside the scope of the rule 131 are not applicable to the metadata map 130. Accordingly, the rule definition interface 422 allows the creator to input one or more data patterns that are relevant to the metadata map 130 that is subject to creation. Data patterns may be, for example, a sequence of characters, letters, wildcard characters, symbols and/or numbers that describe a data format.

Furthermore, a creator can choose to upload the created metadata map 130 to be stored in the repository of metadata maps 130 for sharing the map with other sellers. This process encourages the growth of the number of metadata maps 130 available to sellers. Furthermore, this allows the catalog mapping tool 115 to select recommended metadata maps 130 from a larger pool of available metadata maps 130.

Figure 5:
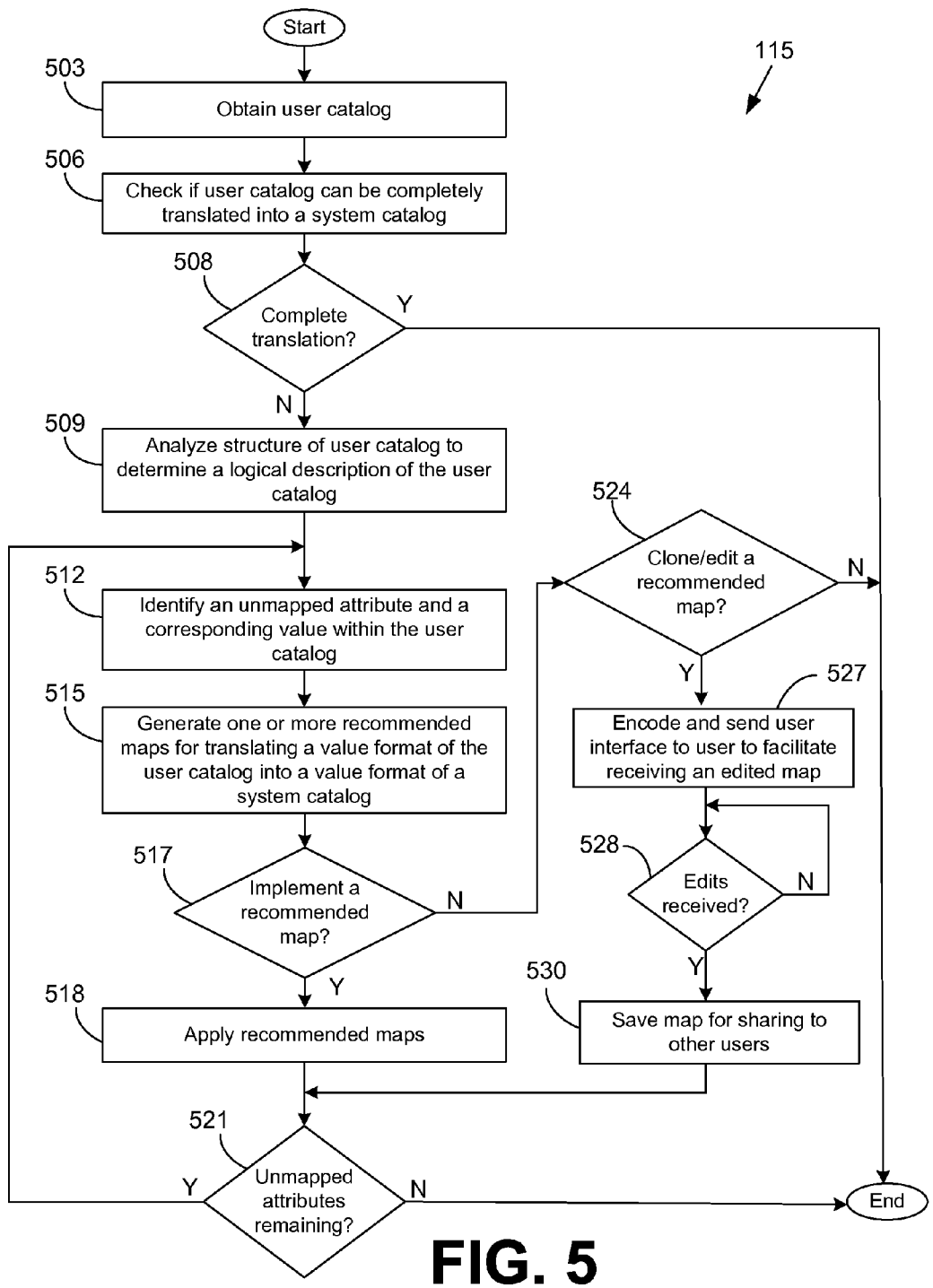
FIG. 5 is a flowchart illustrating one example of functionality implemented as portions of a catalog mapping tool executed in a computing device in the networked environment of FIG. 1 according to various embodiments of the present disclosure.

Referring next to FIG. 5, shown is a flowchart that provides one example of the operation of a portion of the catalog mapping tool 115 according to various embodiments. It is understood that the flowchart of FIG. 5 provides merely an example of the many different types of functional arrangements that may be employed to implement the operation of the portion of the catalog mapping tool 115 as described herein. As an alternative, the flowchart of FIG. 5 may be viewed as depicting an example of steps of a method implemented in the computing device 103 (FIG. 1) according to one or more embodiments.

Beginning with box 503, the catalog mapping tool 115 facilitates obtaining a user catalog 140 (FIG. 1) of items 142 (FIG. 1). Sellers may upload a user catalog 140 using a client 106 (FIG. 1) by way of network 109 (FIG. 1). In box 506, the catalog mapping tool 115 checks if the user catalog can be completely translated into a system catalog 150 (FIG. 1). That is to say, the catalog mapping tool 115 determines if the formatting and/or data structure of the user catalog 140 is recognizable by the system platform. In one embodiment, the catalog mapping tool 115 checks to see if the user catalog 140 has a number of recognizable attribute-value pairs that exceeds a threshold amount. If the user catalog 140 can be completely translated into a system catalog 150, then a system catalog 150 is generated. However, if the catalog mapping tool 115 determines that at least some portion of the user catalog 140 requires mapping, as seen in box 508, then additional inputs are needed to generate the system catalog 150.

In box 509, the catalog mapping tool 115 analyzes the structure of the user catalog 140 to determine a logical description of the user catalog 140. In various embodiments, the catalog mapping tool 115 is configured to determine whether the user catalog 140 conforms to a predetermined standard. For example, a predetermined standard, such as an industry standard, may use a predictable set of formats to encode attribute-value pairs. If the user catalog 140 seems to be in conformity with a predetermined standard, the catalog mapping tool 115 may automatically map attribute value pairs from the user catalog 140 into system catalog 150.

In box 512, the catalog mapping tool 115 identifies one or more unmapped attributes and corresponding values within the user catalog 140. In one embodiment, attribute-value pairs included in the user catalog 140 that are not recognized by the system platform are flagged as "unmapped." Next, in box 515, the catalog mapping tool 115 generates one or more recommended metadata maps 130 (FIG. 1) for translating a value format of the user catalog 140 into a value format of the system catalog 150. The catalog mapping tool 115 may create one or more network pages for presenting a mapping wizard, as seen in the exemplary rendered user interface 193a of FIG. 3.

In box 517, the catalog mapping tool 115 receives an input from the seller as to whether to implement a recommended map. If the catalog mapping tool 115 receives an indication to implement a map, then, as seen in box 518, the recommended map is applied for generating a system catalog 150. In box 521, if additional unmapped attributes remain, then the process is repeated until the user catalog 140 is completely translated.

In box 517, if the catalog mapping tool 115 receives an indication to not implement the recommended map, then, in box 524, the catalog mapping tool 115 may receive an indication to clone or edit a recommended map. If no indication to clone or edit the recommended map is received, then the catalog mapping tool 115 process ends. However, if there is an indication to clone and edit a recommended map, then, in box 527, the catalog mapping tool 115 encodes and sends a user interface to the user to facilitate receiving an edited map. In box 528, the catalog mapping tool 115 waits until an edited map is received. Next, in box 530, the catalog mapping tool 115 saves the edited map for sharing to other users. This allows sellers to create metadata maps 130 for reuse and sharing.

Figure 6:
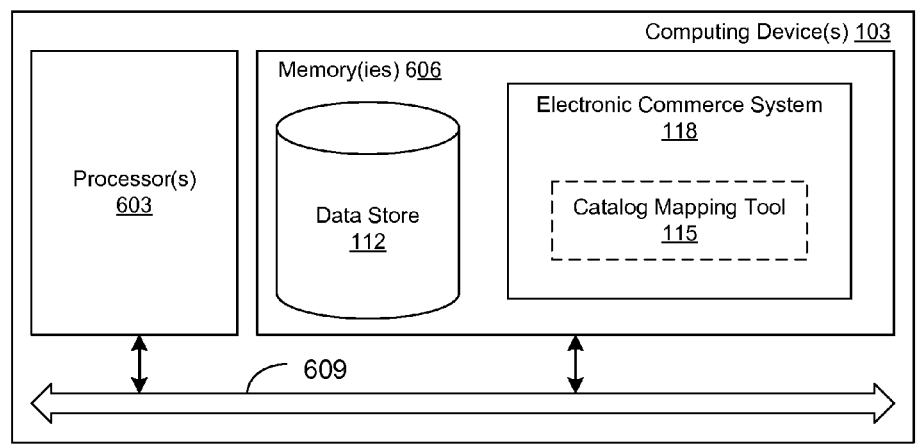
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 118 and potentially other applications. The electronic commerce system 118 may include a number of components or modules such as the catalog mapping tool 115. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the catalog mapping tool 115, the electronic commerce system 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the catalog mapping tool 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the catalog mapping tool 115 and the electronic commerce system 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising machine-readable instructions that, when executed by the computing device, cause the computing device to at least:
store a system catalog in a data store, the system catalog associated with an item, the system catalog comprising a system acceptable format for a value of an attribute describing the item;
identify a user catalog received from a seller, the user catalog associated with the item, the user catalog comprising a user defined format for the value of the attribute describing the item;
generate a plurality of recommended metadata maps, one of the plurality of recommended metadata maps facilitating translation of the value from the user defined format to the system acceptable format;
receive a selection of the one of the plurality of recommended metadata maps for translation; and
translate the user catalog to the system catalog based at least in part on the one of the plurality of recommended metadata maps.

2. The non-transitory computer-readable medium of claim 1, wherein the user defined format for the value is not recognizable by a system platform associated with the computing device.

3. The non-transitory computer-readable medium of claim 1, wherein the machine-readable instructions when executed by the computing device, further cause the computing device to at least encode for rendering on a client device of the seller a user interface comprising the plurality of recommended metadata maps.

4. The non-transitory computer-readable medium of claim 1, wherein the machine-readable instructions when executed by the computing device, further cause the computing device to at least provide a preview for individual ones of the plurality of recommended metadata maps, the preview showing a translation of the user catalog into the system catalog based at least in part the individual ones of the plurality of recommended metadata maps.

5. The non-transitory computer-readable medium of claim 1, wherein the machine-readable instructions when executed by the computing device, further cause the computing device to at least edit the one of the plurality of recommended metadata maps to generate a seller created metadata map.

6. The non-transitory computer-readable medium of claim 1, wherein the machine-readable instructions when executed by the computing device, further cause the computing device to at least encode for rendering on a client device of the seller a user interface that allows the seller to cycle through the plurality of recommended metadata maps to facilitate selection of the one of the plurality of recommended metadata maps.

7. A system, comprising:
at least one computing device; and
an application executable in the at least one computing device, the application comprising machine-readable instructions that, when executed by the at least one computing device, cause the at least one computing device to at least:
identify a system catalog of an item and a user catalog of the item, the system catalog comprising a system acceptable format for a value of an attribute associated with the item, the user catalog comprising a user defined format for the value of the attribute associated with the item, and the user catalog received from a seller;
generate a plurality of recommended metadata maps, one plurality of recommended metadata maps facilitating translation of the value from the user defined format into the system acceptable format;
receive a selection of one of the plurality of recommended metadata maps for translation from a client device associated with the seller; and
translate the user catalog to the system catalog based at least in part on the one of the plurality of recommended metadata maps.

8. The system of claim 7, wherein the user defined format for the value is only recognized by a system platform associated with the seller.

9. The system of claim 7, further comprising machine-readable instructions that, when executed by the at least one computing device, cause the at least one computing device to at least encode for rendering on a client device of the seller a user interface comprising the plurality of recommended metadata maps for selection.

10. The system of claim 9, wherein the one of the plurality of recommended metadata maps is recommended in response to determining that the one of the plurality of recommended metadata maps and the seller are associated with a common industry.

11. The system of claim 7, wherein the one of the plurality of recommended metadata maps is recommended based at least in part on a match between a plurality of contents of the user catalog and a description of the one of the plurality of recommended metadata maps.

12. The system of claim 7, wherein the one of the plurality of recommended metadata maps is recommended based at least in part on a match between a category associated with the item of the user catalog and another category associated with the one of the plurality of recommended metadata maps.

13. A computer-implemented method comprising:
storing, in a memory accessible by at least one computing device, a system catalog for an item in a data store, the system catalog comprising a system acceptable format for a value of an attribute associated with the item;
receiving, by the at least one computing device, a user catalog of the item from a seller, the user catalog comprising a user defined format for the value of the attribute associated with the item, the user defined format for the value only recognizable by a system platform associated with the seller;

suggesting, by the at least one computing device, a plurality of recommended metadata maps, one of the plurality of recommended metadata maps facilitating translation of the value from the user defined format into the system acceptable format; and applying, by the at least one computing device, one of the recommended metadata maps to the user catalog to facilitate translation of the value from the user defined format into the system acceptable format.

14. The method of claim 13, further comprising encoding for display, by the at least one computing device, a user interface on a client device of the seller, the user interface comprising a plurality of selectable components for the plurality of recommended metadata maps.

15. The method of claim 14, further comprising receiving, by the at least one computing device, a selection of one of the selectable components for the one of the plurality of recommended metadata maps for translation from a client device of the seller.

16. The method of claim 13, wherein the plurality of recommended metadata maps are recommended based at least in part on historical data of a plurality of known attribute-value pairs.

17. The method of claim 13, further comprising encoding for display, by the at least one computing device, another a user interface on a client device of the seller, the other user interface comprising a plurality of edit fields to facilitate editing the one of the plurality of recommended metadata maps to generate a seller created metadata map.

18. The method of claim 17, wherein the user interface facilitates receiving an indication from the seller to share the seller created metadata map with a plurality of other sellers.

19. The method of claim 13, further comprising storing, in the memory, the seller created metadata map for allowing a plurality of other sellers to use the seller created metadata map.

20. The method of claim 13, further comprising determining, by the at least one computing device, that a number of unrecognizable attribute value pairs is below a threshold amount.

* * * * *